United States Patent
Eo et al.

(10) Patent No.: US 9,643,621 B2
(45) Date of Patent: May 9, 2017

(54) METHOD AND APPARATUS FOR GUIDING INERTIA DRIVING OF MANUAL TRANSMISSION VEHICLE

(71) Applicant: Hyundai Motor Company, Seoul (KR)

(72) Inventors: Jeong Soo Eo, Gyeonggi-do (KR); Sung Jae Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/864,128

(22) Filed: Sep. 24, 2015

(65) Prior Publication Data

US 2016/0167676 A1    Jun. 16, 2016

(30) Foreign Application Priority Data

Dec. 11, 2014    (KR) .......................... 10-2014-0178110

(51) Int. Cl.
*B60W 50/08*    (2012.01)
*B60W 50/14*    (2012.01)
*B60W 30/18*    (2012.01)

(52) U.S. Cl.
CPC ... *B60W 50/082* (2013.01); *B60W 2030/1809* (2013.01); *B60W 2050/146* (2013.01); *B60W 2510/069* (2013.01); *B60W 2520/10* (2013.01); *B60W 2540/04* (2013.01); *B60W 2540/10* (2013.01); *B60W 2540/12* (2013.01); *B60W 2540/14* (2013.01); *B60W 2540/16* (2013.01)

(58) Field of Classification Search
CPC .............. B60W 50/14; B60W 50/082; B60W 2050/146; B60W 2540/10; B60W 2540/14; B60W 2520/10
See application file for complete search history.

(56) References Cited

U.S. PATENT DOCUMENTS

| 6,356,831 | B1 | 3/2002 | Michelini et al. | |
|---|---|---|---|---|
| 2009/0030582 | A1* | 1/2009 | Jacobi | B60K 26/021 701/51 |
| 2010/0219946 | A1* | 9/2010 | Wang | F16H 63/42 340/456 |
| 2013/0116906 | A1* | 5/2013 | Christen | B60W 10/02 701/93 |

(Continued)

FOREIGN PATENT DOCUMENTS

| JP | 2009-280170 A | 12/2009 |
|---|---|---|
| JP | 2012-172578 A | 9/2012 |

(Continued)

*Primary Examiner* — Calvin Cheung
(74) *Attorney, Agent, or Firm* — Mintz Levin Cohen Ferris Glovsky and Popeo, P.C.; Peter F. Corless

(57) ABSTRACT

An apparatus and method for guiding inertia driving of a manual transmission vehicle is provided to maximally extend a no-load driving state with an inertia driving state by blocking a power transmission path of a drive train. The apparatus includes a user selection switch operated to select a coasting mode and a display unit configured to display an entrance enabled state to an inertia driving mode to allow the entrance enabled state to be visually recognized. In addition, a controller is configured to receive an operation signal of the user selection switch and display the entrance enabled state to the inertia driving mode on the display unit to induce the inertia driving mode selection.

12 Claims, 5 Drawing Sheets

(56) References Cited

U.S. PATENT DOCUMENTS

| | | | |
|---|---|---|---|
| 2013/0141231 A1* | 6/2013 | Aberizk | B60Q 1/302 340/467 |
| 2013/0253743 A1* | 9/2013 | Maruyama | B60K 6/442 701/22 |
| 2014/0088858 A1* | 3/2014 | Stefan | B60K 35/00 701/123 |
| 2015/0362065 A1* | 12/2015 | Johansson | B60W 30/18072 701/65 |

FOREIGN PATENT DOCUMENTS

| | | |
|---|---|---|
| JP | 2014-084960 A | 5/2014 |
| JP | 2014-091338 A | 5/2014 |
| JP | 2014-111976 A | 6/2014 |
| KR | 10-2010-0087856 A | 8/2010 |
| KR | 10-2014-0064110 | 5/2014 |

\* cited by examiner

METHOD AND APPARATUS FOR GUIDING INERTIA DRIVING OF MANUAL TRANSMISSION VEHICLE

CROSS-REFERENCE TO RELATED APPLICATION

This application claims under 35 U.S.C. §119(a) the benefit of Korean Patent Application No. 10-2014-0178110 filed Dec. 11, 2014, the entire contents of which are incorporated herein by reference.

BACKGROUND (a) Technical Field

The present invention relates to an apparatus and method for guiding inertia driving of a manual transmission vehicle which maximally extends a no-load driving state with an inertia driving state (e.g., complete engine stop state) by blocking a power transmission path of a drive train.

(b) Background Art

As the fuel efficiency and exhaust regulations are reinforced, hybrid technologies are being multi-directionally developed. Hybrid vehicles are classified into micro, mild, soft and, hard (e.g., full type) hybrids based on the capacity of the electric system, and provide an idle stop and go function.

Recently, the development of a mild hybrid system is being extensively carried out, and an additional fuel efficiency improvement technology is being developed by supplementing the typical idle stop and go function. As an example of the fuel efficiency improvement technology, a technology has been developed to reduce unnecessary fuel consumption by completely stopping the engine during coasting or inertia driving. To implement such a technology, an electromagnetic clutch is applied to electrically block the engine power. Particularly, for a manual transmission (M/T) vehicle, the configuration of a control module and the modification of a vehicle system are necessary for the control of the electromagnetic clutch, which may incur the change of control strategy and an increase in manufacturing cost.

FIG. 1 is a view illustrating a power transmission structure of a typical manual transmission vehicle according to the related art. In particular, the power of an engine 1 is delivered to wheels via an electromagnetic clutch 2 and a transmission 3. Generally, the coasting state is a broad concept that includes the inertia driving, but herein, is subdivided and redefined as follows.

Coasting: upon deceleration during driving, releasing the accelerator pedal and running by power (inertia) generated until then.

Inertia driving: power of the engine is completely blocked during coasting (e.g., neutral of gear or separation of engine clutch), including the stop state of the engine.

Meanwhile, in a related-art, to minimize the fuel consumption rate of a hybrid vehicle, coasting in which an electromagnetic engine clutch is used is performed, or an electric power auxiliary function for the improvement of reacceleration responsibility during coasting is being applied.

The above information disclosed in this section is merely for enhancement of understanding of the background of the invention and therefore it may contain information that does not form the prior art that is already known in this country to a person of ordinary skill in the art.

SUMMARY

The present invention provides an apparatus and method for guiding inertia driving of a manual transmission vehicle, which maximally extends a no-load driving state with an inertia driving state (e.g., complete engine stop state) by blocking a power transmission path of a drive train through a driver's intention and Graphical User Interface (GUI) during the coasting enabled state, and may determine an engine restart point for securing the reacceleration responsibility during the inertia driving.

In one aspect, the present invention provides an apparatus for guiding inertia driving of a manual transmission vehicle that may include: a user selection switch operated by a driver to select a coasting mode; a display unit configured to display an entrance enabled state to an inertia driving mode to allow a driver to recognize the entrance enabled state; and a controller configured to receive an operation signal of the user selection switch and display the entrance enabled state to the inertia driving mode on the display unit to induce a driver to select the inertia driving mode.

In an exemplary embodiment, the controller may be configured to determine that a vehicle enters the coasting mode when the user selection switch is in an on-state, when the speed of a vehicle is equal to or greater than a predetermined threshold, when an accelerator pedal and a brake pedal are in an off-state (e.g., disengaged), and when an engine negative pressure is equal to or greater than a predetermined threshold. In another exemplary embodiment, the controller may be configured to allow a vehicle to enter the inertia driving mode in response to sensing a gearshift moved to a neutral stage position during the coasting mode.

In addition, the controller may be configured to allow a vehicle to enter the inertia driving mode in response to sensing that an engine clutch is shifted to an open state during the coasting mode. The controller may then be configured to release the inertia driving mode when an engine clutch is shifted to an open-state while a gearshift is positioned in a neutral stage during the inertia driving mode. Further, the controller may be configured to release the inertia driving mode when an engine clutch is shifted to a close-state while a gearshift is not positioned in a neutral stage during the inertia driving mode. The display unit may be configured to display an on-state of the user selection switch, an entrance enabled state to the inertia driving mode, and an inertial driving state.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
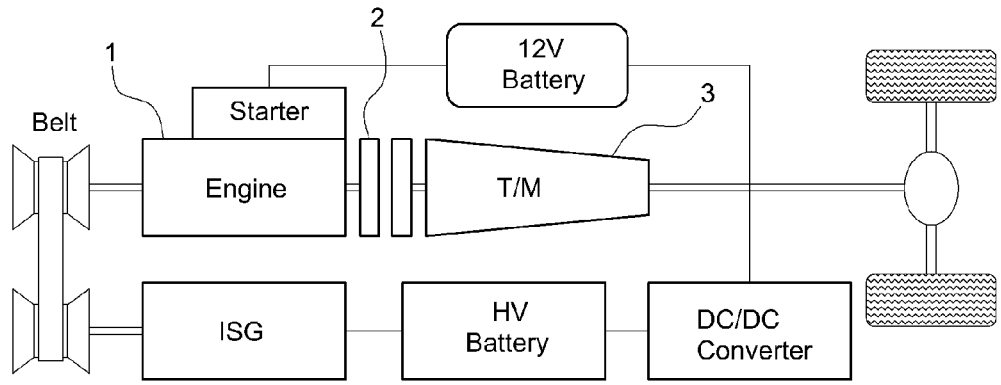
FIG. 1 is a view illustrating a power transmission structure of a typical manual transmission vehicle according to the related art.

Reference numerals set forth in the Drawings includes reference to the following elements as further discussed below:

10: user selection switch
20: controller
30: display unit

It should be understood that the accompanying drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, exemplary embodiments of the present invention will be described in detail with reference to the accompanying drawings so that those skilled in the art can easily carry out the present invention.

The present invention relates to a technology of guiding inertia driving using a mechanical clutch of a manual transmission hybrid vehicle, and may minimize the fuel consumption rate by guiding inertia driving of a manual transmission vehicle using a general mechanical engine clutch by omitting the use of a separate electromagnetic engine clutch. Thus, in the present invention, a Graphical User Interface (GUI) may be configured to allow a driver to selectively determine coasting and inertia driving modes of a manual transmission vehicle, and inertia driving may be guided by determining whether coasting and inertia driving are possible. In addition, in the present invention, an engine start point may be predetermined to improve the reacceleration responsibility when the release of inertia driving is determined.

Figure 2:
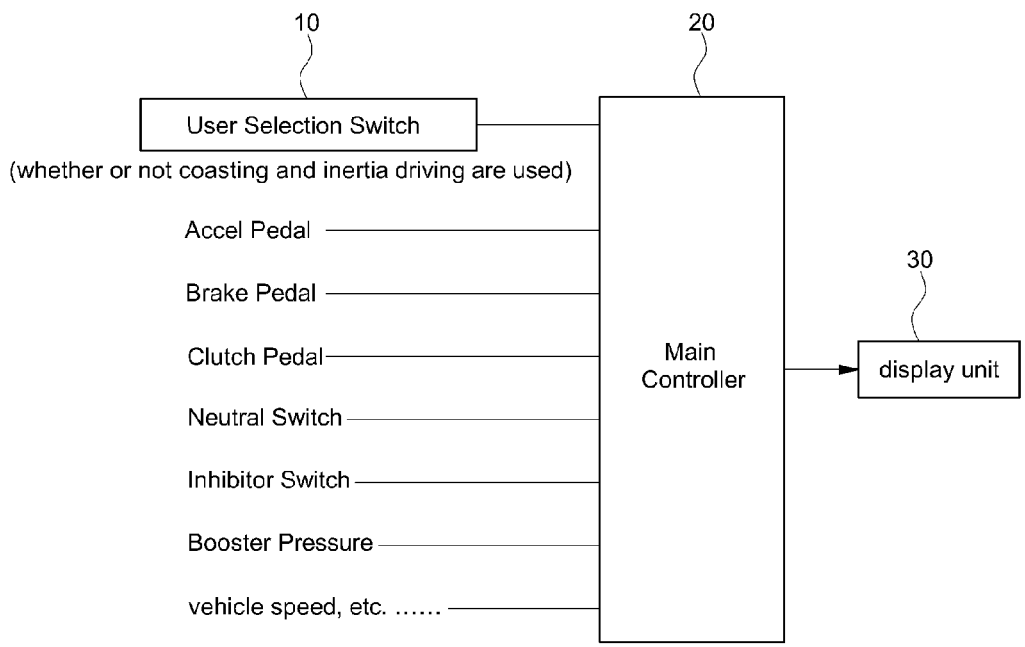
FIG. 2 is a view illustrating a configuration of an inertia driving guiding apparatus of a manual transmission vehicle according to an exemplary embodiment of the present invention.

As shown in FIG. 2, an apparatus for guiding inertia driving of a manual transmission vehicle according to an exemplary embodiment of the present invention may include a user selection switch 10, a controller 20, and a display unit 30. Particularly, for a manual transmission vehicle equipped with an idle stop and go system, when a driver has an economical driving intention, the controller 20 of a vehicle may be configured to detect the economical driving intention by the user selection switch 10 disposed within a vehicle (e.g., by receiving a user input).

The user selection switch 10 may be configured to generate a signal for coasting and inertia driving based on a selection of a driver, and may be disposed within a vehicle. Additionally, the user selection switch 10 may be configured to transmit information regarding selection and deselection of coasting mode by on/off operation of a driver to the controller 20. When a driver intends to select coasting and inertia driving modes, the user selection switch 10 may be turned on to enter the coasting mode.

Furthermore, to operate the overall functions of a vehicle, the controller 20 may be configured to receive accelerator pedal information, brake pedal information, clutch pedal information, neutral switch information, inhibitor switch information, booster pressure information, and vehicle speed information. When there is an economical driving intention of a driver, that is, the user selection switch 10 is selected, the controller 20 may be configured to determine whether coasting and inertia driving mode may be entered, and may provide driving guides for each situation to a driver.

In a typical gasoline vehicle, coasting may correspond to fuel spray blocking control, and the inertia driving function in a complete engine stop state may not be provided. Additionally, coasting may be used for the purpose of the engine brake in general gasoline vehicle. However, when a deceleration intention is present during coasting, the in-gear state may be maintained, and when the deceleration intention increases, the operation of the brake pedal may be simultaneously performed.

Accordingly, when a driver has an economical driving intention and has no rapid deceleration intention during coasting, the controller 20 may be configured to guide inertia driving by considering the current location of gear and the state of engine clutch. In particular, based on input information (e.g., brake pedal information, etc.), the controller 20 may be configured to recognize that a driver has no rapid deceleration intention.

Figure 3:
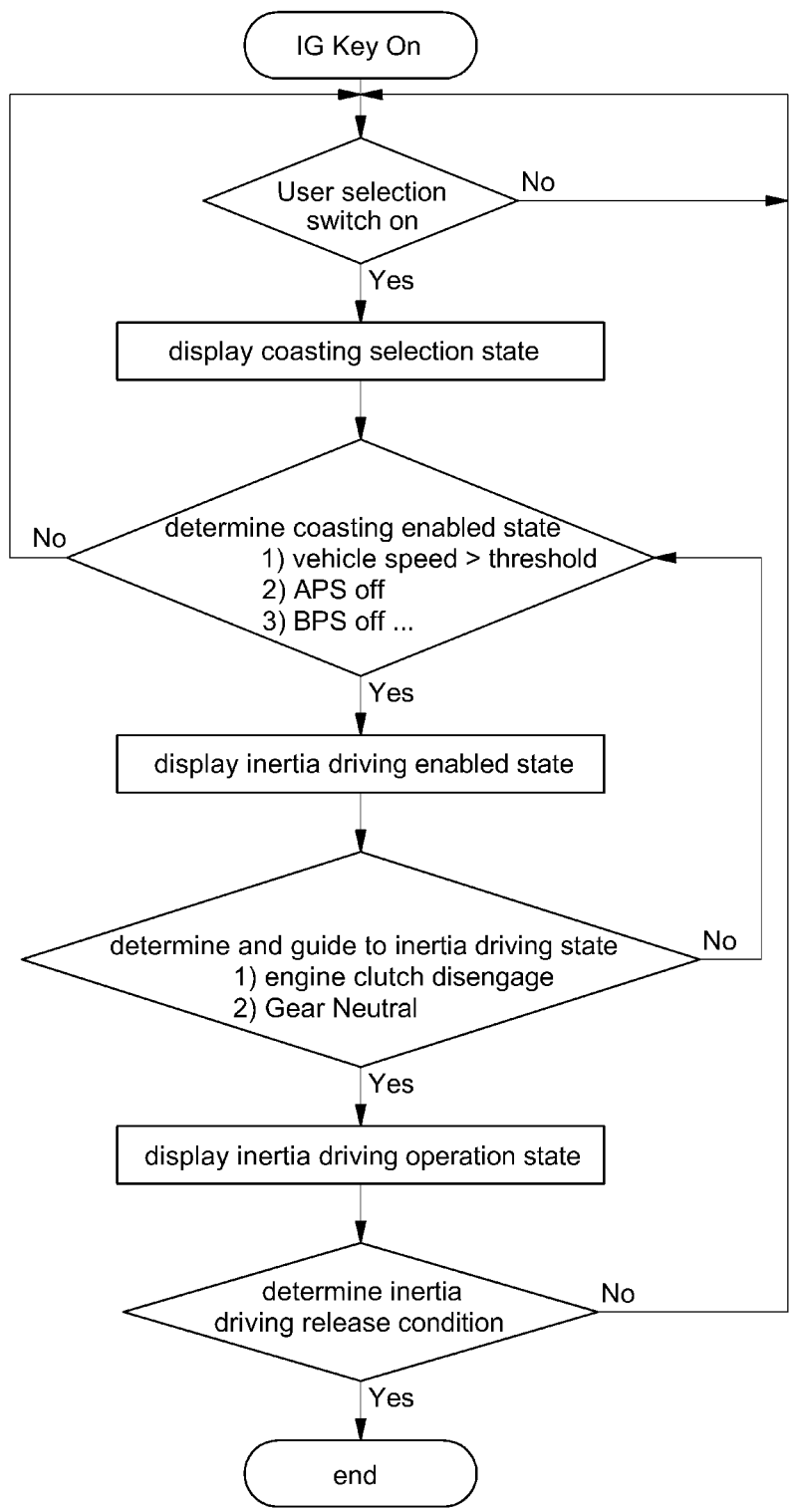
FIGS. 3 and 4 are views illustrating an inertia driving guiding control process of a manual transmission vehicle according to an exemplary embodiment of the present invention.
Figure 4:
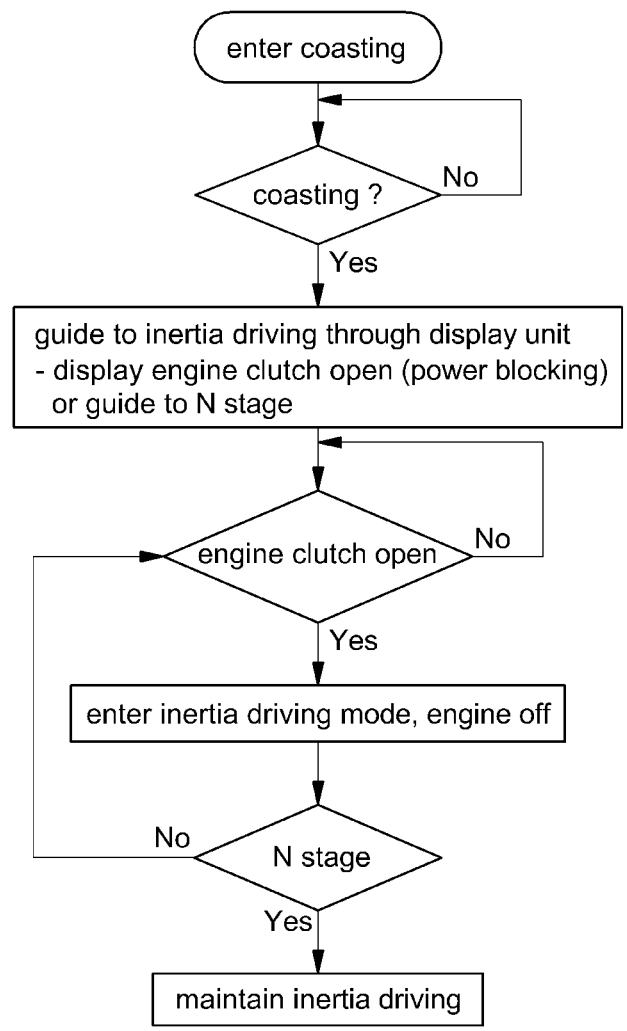

In other words, as shown in FIGS. 3 and 4, in response to determining that a vehicle is under the coasting enabled condition (e.g., entrance state to coasting mode) and the gearshift is connected to a particular stage, the controller 20 may be configured to allow a driver to recognize the inertia driving enabled state and to move/shift the gearshift to neutral position or to manually separate (e.g., open) the engine clutch, enabling inertia driving in the complete engine stop (e.g., engine off) state. Particularly, a driver may check the inertia driving guide situation of the controller 20 using the display unit 30 such as a display device (e.g., a screen) within a vehicle.

In a coasting enabled state, when the gearshift is positioned in a neutral stage or the engine clutch is in an open state, the inertia driving mode may be implemented. Accordingly, to select inertia driving based on the inertia driving guide of the controller 20, the gearshift may be shifted to the neutral stage when the entrance condition to the coasting mode is satisfied (e.g., coasting enabled state), or the engine clutch may be opened when the coasting condition is satisfied.

The controller 20 may be configured to determine the following conditions to determine the coasting enabled state and the entrance condition:

1. Whether a driver operates on/off by selection/operation of the user selection switch, that is, determine operation of selection switch based on user input.

2. Whether the vehicle speed condition is satisfied: vehicle speed condition equal to or greater than a predetermined threshold.

3. Whether the accelerator pedal and the brake pedal are disengaged.

4. Whether the engine negative pressure condition is satisfied: engine negative pressure condition equal to or greater than a predetermined threshold.

The controller 20 may thus be configured to determine the foregoing conditions, and determine whether the display unit 30 operates as a user interface and whether the vehicle system operates without error. When the conditions are satisfied, a vehicle may be determined as having entered the coasting mode (e.g., coasting state). Thus, when a vehicle enters the coasting mode in which coasting is possible, a driver may satisfy the condition (e.g., gearshift may be positioned in neutral stage/N stage or open engine clutch/ block engine power) for entering the inertia driving mode, to enter the inertia driving mode of complete engine stop state.

Accordingly, when the controller 20 senses the gearshift being positioned in the neutral stage during the coasting mode or the engine clutch is shifted to the open state, a vehicle may enter the inertia driving mode and may run (e.g., travel, be driven in, etc.) in the inertia driving mode. In particular, the controller 20 may be a hybrid controller (Hybrid Control Unit (HCU)) configured to operate overall function of a vehicle, and the display unit 30 may include a visual display device mounted within a vehicle. The display unit 30 may be operated by the controller 20.

Figure 5:
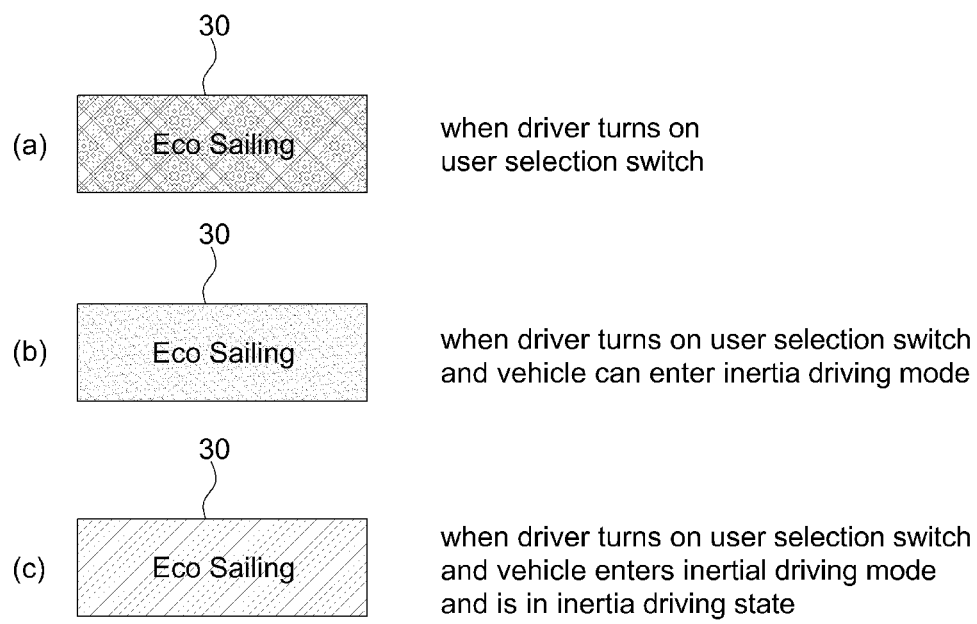
FIG. 5 is a view illustrating an operational state of a display unit of an inertia driving guiding apparatus according to an exemplary embodiment of the present invention.

As shown in FIG. 5, the on-state of the user selection switch 10, the entrance enabled state to the inertia driving mode, and the inertial driving state may be visually recognizable on the display unit 30. When a vehicle enters the inertia driving mode, to release the inertia driving mode, the controller 20 may be configured to determine whether the release condition of the inertia driving mode is satisfied. During the inertia driving of a vehicle, the inertia driving mode is to be released by a system or a driver, and particularly, a restart point may be determined for the improvement of responsibility upon reacceleration during the deceleration. Accordingly, the controller 20 may be configured to determine, based on the state transition of the engine clutch, the engine restart determination point during the inertia driving mode, and thus may be configured to rapidly determine the acceleration intention of a driver, thereby securing the reacceleration responsibility of a vehicle.

In other words, when any one of the coasting mode entrance conditions (e.g., user selection switch, accelerator pedal, brake pedal, and engine negative pressure) is unsatisfied during the inertia driving, or when the engine clutch state shifts from the close state to the open state during the inertia driving in which the gearshift is moved to the neutral stage, or when the engine clutch state shifts from the open state to the close state during the inertia driving in which the engine clutch is opened to block the engine power, the controller 20 may be configured to determine that the release condition of the inertia driving mode is satisfied, and may be configured to release the inertia driving.

Figure 6:
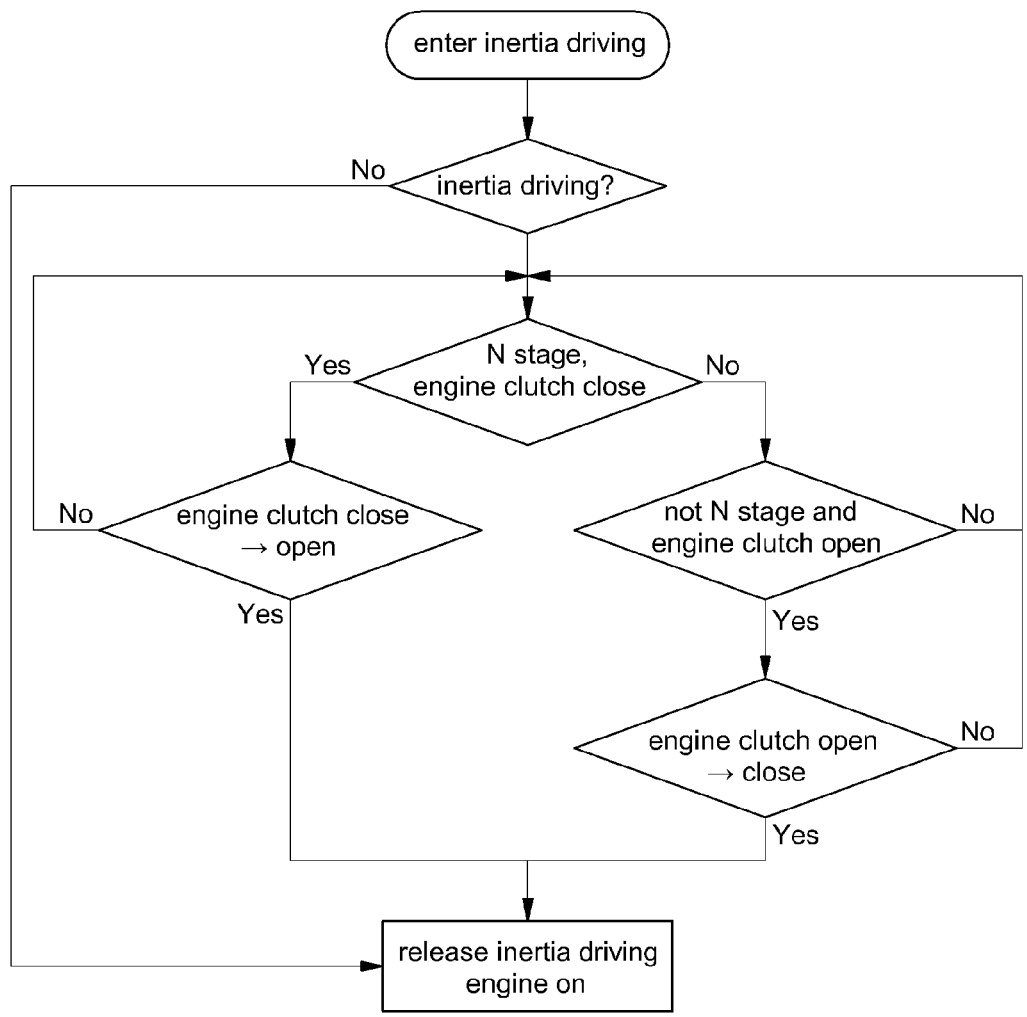
FIG. 6 is a view illustrating an inertia driving release control process of a manual transmission vehicle according to an exemplary embodiment of the present invention.

For example, as shown in FIG. 6, when the engine clutch is shifted from the close state to the open state during the inertia driving in which the gearshift is positioned in the neutral stage and the engine clutch is closed, or when the engine clutch is shifted from the open state to the close state during the inertia driving in which the gearshift is positioned in a gear stage except the neutral stage and the engine clutch is opened (e.g., engine power blocked), the controller 20 may be configured to determine that the release condition of the inertia driving mode is satisfied, and may be configured to release the inertial driving mode and turn on the engine.

In a technology for minimizing the fuel consumption rate using a typical electromagnetic engine clutch, the engine start point is inevitably delayed due to the control delay and the state determination for the electromagnetic engine clutch control. However, in the present invention, since the engine restart point during the inertia driving mode may be determined based on the state transition of the engine clutch, the acceleration intention of a driver may be determined more rapidly.

The technology of guiding inertia driving of a manual transmission vehicle according to an exemplary embodiment of the present invention has the following effects:

1. An economical driving mode using an interface with a driver may be achieved, and thus the marketability and fuel efficiency may be improved.

2. The reacceleration responsibility may be secured by differentiating the inertia driving release conditions for each inertia driving mode based on the entrance condition to the inertia driving mode. Additionally, the inertia driving mode may be implemented without a separate control system similar to when a typical electromagnetic engine clutch is used.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An apparatus for guiding inertia driving of a manual transmission vehicle, comprising:
    a user selection switch operated to select a coasting mode;
    a display unit configured to display an entrance enabled state to an inertia driving mode to allow the entrance enabled state to be recognized visually; and
    a controller configured to:
        receive an operation signal of the user selection switch and display the entrance enabled state to the inertia driving mode on the display unit to induce the inertia driving mode selection; and
        determine that a vehicle enters the coasting mode when the user selection switch is in an on-state, when the speed of a vehicle is equal to or greater than a predetermined threshold, when an accelerator pedal and a brake pedal are disengaged, and when an engine negative pressure is equal to or greater than a predetermined threshold.

2. The apparatus of claim 1, wherein the controller is configured to allow a vehicle to enter the inertia driving mode in response to detecting a gearshift positioned in a neutral stage during the coasting mode.

3. The apparatus of claim 1, wherein the controller is configured to allow a vehicle to enter the inertia driving mode in response to detecting an engine clutch shifted to an open state during the coasting mode.

4. The apparatus of claim 1, wherein the controller is configured to release the inertia driving mode when an engine clutch is shifted to an open-state while a gearshift is positioned in a neutral stage during the inertia driving mode.

5. The apparatus of claim 1, wherein the controller is configured to release the inertia driving mode when an engine clutch is shifted to a close-state while a gearshift is not positioned in a neutral stage during the inertia driving mode.

6. The apparatus of claim 1, wherein the display unit is configured to display an on-state of the user selection switch, an entrance enabled state to the inertia driving mode, and an inertial driving state.

7. A method for guiding inertia driving of a manual transmission vehicle, comprising:
    displaying, by a controller, an entrance enabled state to an inertia driving mode to allow the entrance enabled state to be recognized visually;
    receiving, by the controller, an operation signal of a user selection switch;
    displaying, by the controller, the entrance enabled state to the inertia driving mode on the display unit to induce the inertia driving mode selection; and
    determining, by the controller, that a vehicle enters the coasting mode when the user selection switch is in an on-state, when the speed of a vehicle is equal to or greater than a predetermined threshold, when an accelerator pedal and a brake pedal are disengaged, and when an engine negative pressure is equal to or greater than a predetermined threshold.

8. The method of claim 7, further comprising:
allowing, by the controller, a vehicle to enter the inertia driving mode is response to detecting a gearshift positioned in a neutral stage during the coasting mode.

9. The method of claim 7, further comprising,
allowing, by the controller, a vehicle to enter the inertia driving mode in response to detecting an engine clutch shifted to an open state during the coasting mode.

10. The method of claim 7, further comprising:
releasing, by the controller, the inertia driving mode when an engine clutch is shifted to an open-state while a gearshift is positioned in a neutral stage during the inertia driving mode.

11. The method of claim 7, further comprising:
releasing, by the controller, the inertia driving mode when an engine clutch is shifted to a close-state while a gearshift is not positioned in a neutral stage during the inertia driving mode.

12. The method of claim 7, further comprising:
displaying, by the controller, an on-state of the user selection switch, an entrance enabled state to the inertia driving mode, and an inertial driving state.

* * * * *